(12) United States Patent
Bamford et al.

(10) Patent No.: US 10,674,140 B2
(45) Date of Patent: Jun. 2, 2020

(54) METHOD, PROCESSING DEVICE, AND COMPUTER SYSTEM FOR VIDEO PREVIEW

(71) Applicant: HTC Corporation, Taoyuan (TW)

(72) Inventors: Drew Bamford, Bellevue, WA (US); Yu-Hsien Chang, Taoyuan (TW); Jo-Wei Hsu, Seattle, WA (US); Yihsiu Chen, Seattle, WA (US); Andrew Charles Hunt, Seattle, WA (US)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 15/842,897

(22) Filed: Dec. 15, 2017

(65) Prior Publication Data

US 2018/0176550 A1    Jun. 21, 2018

Related U.S. Application Data

(60) Provisional application No. 62/434,426, filed on Dec. 15, 2016.

(51) Int. Cl.
*H04N 13/30* (2018.01)
*H04N 13/398* (2018.01)
*H04N 21/485* (2011.01)
*H04N 13/139* (2018.01)

(52) U.S. Cl.
CPC ........... *H04N 13/30* (2018.05); *H04N 13/398* (2018.05); *H04N 21/4854* (2013.01); *H04N 13/139* (2018.05); *H04N 2213/007* (2013.01)

(58) Field of Classification Search
CPC ............ G06T 13/00–80; G06T 19/006; H04N 13/356; H04N 2213/007; H04N 21/431–4318; H04N 21/4854
See application file for complete search history.

(56) References Cited

U.S. PATENT DOCUMENTS

| 6,121,963 A | * | 9/2000 | Ange | G06F 16/40 715/202 |
| 2008/0005696 A1 | * | 1/2008 | Shivaji-Rao | G06F 3/04845 715/822 |

(Continued)

FOREIGN PATENT DOCUMENTS

| CN | 101969573 | 2/2011 |
| CN | 102577398 | 7/2012 |

OTHER PUBLICATIONS

NPL Video Titled "Gear VR—Oculus Cinema"—published Dec. 15, 2014, available for viewing at: https://www.youtube.com/watch?v=m1K3EMJ048Y; select screenshots included. (Year: 2014).*

(Continued)

*Primary Examiner* — Daniel F Hajnik
(74) *Attorney, Agent, or Firm* — JCIPRNET

(57) ABSTRACT

The disclosure provides a method, a processing device, and a computer system for video preview. An exemplary method is applicable to a processing device and includes the following steps. A video file is received and decoded to obtain video frames. Each of the video frames is converted into texture data. Shading computations are performed on the texture data to respectively generate render video outputs for video preview, where each of the shading computations corresponds to a different designated video viewing mode.

12 Claims, 4 Drawing Sheets

(56) References Cited

U.S. PATENT DOCUMENTS

| | | | |
|---|---|---|---|
| 2010/0328425 A1* | 12/2010 | Nagaraj | G06T 9/001 |
| | | | 348/42 |
| 2011/0032328 A1 | 2/2011 | Raveendran et al. | |
| 2011/0032330 A1 | 2/2011 | Kim et al. | |
| 2011/0090304 A1* | 4/2011 | Song | H04N 21/4821 |
| | | | 348/42 |
| 2011/0122126 A1 | 5/2011 | Han | |
| 2012/0154526 A1* | 6/2012 | Ji | H04N 13/15 |
| | | | 348/43 |
| 2012/0170903 A1* | 7/2012 | Shirron | H04N 5/783 |
| | | | 386/230 |
| 2012/0206450 A1* | 8/2012 | Chen | H04N 13/139 |
| | | | 345/419 |
| 2013/0002838 A1* | 1/2013 | Takenaka | G09G 3/20 |
| | | | 348/56 |
| 2013/0328784 A1 | 12/2013 | Lee | |
| 2017/0161941 A1* | 6/2017 | Lee | G06T 15/005 |

OTHER PUBLICATIONS

"Search Report of Europe Counterpart Application", dated Apr. 17, 2018, p. 1-p. 7, in which the listed references were cited.

"Office Action of Taiwan Counterpart Application," dated Sep. 7, 2018, pp. 1-10.

\* cited by examiner

US 10,674,140 B2

METHOD, PROCESSING DEVICE, AND COMPUTER SYSTEM FOR VIDEO PREVIEW

CROSS-REFERENCE TO RELATED APPLICATION

This application claims the priority benefit of U.S. provisional application Ser. No. 62/434,426, filed on Dec. 15, 2016. The entirety of the above-mentioned patent application is hereby incorporated by reference herein and made a part of this specification.

TECHNICAL FIELD

The disclosure relates to a video preview technique.

BACKGROUND

Virtual reality creates an illusion of reality with realistic images, sounds, and other sensations that replicate a real environment or an imaginary setting. A virtual reality environment would offer a user immersion, navigation, and manipulation that simulate his physical presence in the real world or imaginary world. Current trends for virtual reality content revolve around the development of video games and movies. In particular, several video playback applications which allow videos to be played in a virtual reality system have been created recently and have delivered a powerful immersive cinema experience with unlimited screen space and minimal distractions from the real world.

However, videos may come in various different screen modes (e.g. flat screen, 180-degree, and 360-degree screen viewing modes) and different stereoscopic rendering techniques (e.g. monoscopic, side-by-side stereoscopic, and over-under stereoscopic modes). Video containers do not carry such metadata so the user needs to proceed through a trial-and-error process to determine the best viewing configuration. If a wrong video viewing mode is selected, video images would be distorted with visual artifacts and become unpleasant to view. The user would have to make another selection until the best one is found. The entire process can be extremely tedious and time-consuming and lead to user frustration.

SUMMARY OF THE DISCLOSURE

A method, a processing device, and a computer system for video preview are proposed, where the user is able to select the best video viewing mode in a simple and intuitive fashion.

According to one of the exemplary embodiments, the method is applicable to a processing device and includes the following steps. A video file is received and decoded to obtain video frames. Each of the video frames is converted into texture data. Shading computations are performed on the texture data to respectively generate multiple render video outputs for video preview, where each of the shading computations corresponds to a different designated video viewing mode.

According to one of the exemplary embodiments, the processing device includes a memory and at least one processor coupled to the memory. The memory is configured to store data. The processor is configured to receive a video file, decode the video file to obtain video frames, convert each of the video frames into texture data, and perform shading computations on the texture data to respectively generate multiple render video outputs for video preview, where each of the shading computations corresponds to a different designated video viewing mode.

According to one of the exemplary embodiments, the method is applicable to a computer system having a screen, an input device, and a processing device connected to the screen and the input device, and the method includes the following steps. A video file is received and decoded to obtain video frames by the processing device. Each of the video frames is converted into texture data by the processing device. Shading computations are performed on the texture data by the processing device to respectively generate multiple render video outputs, where each of the shading computations corresponds to a different designated video viewing mode. The render video outputs are played in a preview interface on the screen in the virtual world by the processing device for user selection through the input device.

According to one of the exemplary embodiments, the system includes a screen, an input device, and a processing device. The screen is configured to display contents. The input device is configured to receive inputs from a user. The processing device is connected to the screen and the input device and configured to receive a video file and decode the video file to obtain video frames, to convert each of the video frames into texture data and perform shading computations on the texture data to respectively generate multiple render video outputs, and to play the render video outputs in a preview interface on the screen in the virtual world for user selection through the input device, where each of the shading computations corresponds to a different designated video viewing mode.

In order to make the aforementioned features and advantages of the present disclosure comprehensible, preferred embodiments accompanied with figures are described in detail below. It is to be understood that both the foregoing general description and the following detailed description are exemplary, and are intended to provide further explanation of the disclosure as claimed.

It should be understood, however, that this summary may not contain all of the aspect and embodiments of the present disclosure and is therefore not meant to be limiting or restrictive in any manner. Also the present disclosure would include improvements and modifications which are obvious to one skilled in the art.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

Figure 1:
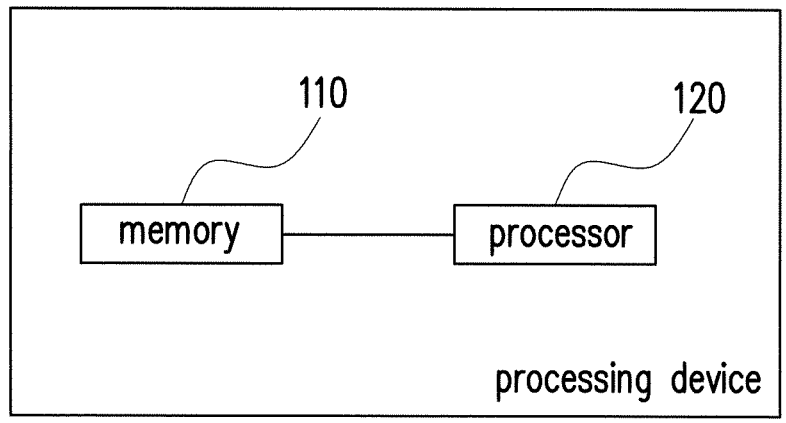
FIG. 1 illustrates a schematic diagram of a proposed processing device for video preview in accordance with one of the exemplary embodiments of the disclosure.

To make the above features and advantages of the application more comprehensible, several embodiments accompanied with drawings are described in detail as follows.

DESCRIPTION OF THE EMBODIMENTS

Some embodiments of the disclosure will now be described more fully hereinafter with reference to the accompanying drawings, in which some, but not all embodiments of the application are shown. Indeed, various embodiments of the disclosure may be embodied in many different forms and should not be construed as limited to the embodiments set forth herein; rather, these embodiments are provided so that this disclosure will satisfy applicable legal requirements. Like reference numerals refer to like elements throughout.

FIG. 1 illustrates a schematic diagram of a proposed processing device for video preview in accordance with one of the exemplary embodiments of the disclosure. All components of the processing device and their configurations are first introduced in FIG. 1. The functionalities of the components are disclosed in more detail in conjunction with FIG. 2.

Referring to FIG. 1, an exemplary processing device 100 would include a memory 110 and at least one processor 120 coupled thereto. The processing device 100 may be a computing device with computing capability, such as a personal computer, a laptop computer, a workstation, a set-top box, a game console, and so forth.

The memory 110 would include a data storage device in various forms of non-transitory, volatile, and non-volatile memories which would store buffered or permanent data as well as compiled programming codes used to execute functions of the processing device 100.

The processor 120 may be one or more of a North Bridge, a South Bridge, a field programmable array (FPGA), a programmable logic device (PLD), an application specific integrated circuit (ASIC), or other similar device or a combination thereof. The processor may also be a central processing unit (CPU), a programmable general purpose or special purpose microprocessor, a digital signal processor (DSP), a graphics processing unit (GPU), or other similar device or a combination thereof. For illustrative purposes, the processor 120 would be a combination of CPU and GPU. The CPU would perform basic arithmetic, logical, control, and input/output (110) operations specified by instructions of a computer program, while the GPU, often with a highly parallel processing architecture, would perform rapid computation primarily for the purpose of render images.

Figure 2:
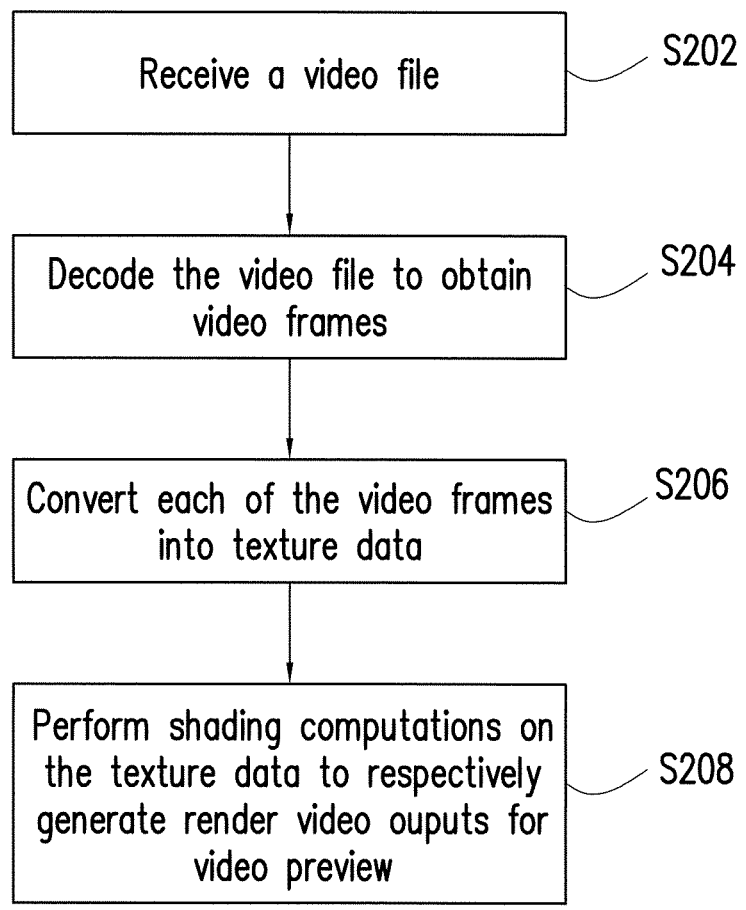
FIG. 2 illustrates a flowchart of a proposed method for video preview in accordance with one of the exemplary embodiments of the disclosure.

FIG. 2 illustrates a flowchart of a proposed method for video preview in accordance with one of the exemplary embodiments of the disclosure. The steps of FIG. 2 could be implemented by the proposed processing device 100 as illustrated in FIG. 1.

Referring to FIG. 2 in conjunction with FIG. 1, the processor 120 of the processing device 100 would receive a video file (Step S202) and decode the video file to obtain video frames (Step S204). Herein, the processor 120 may receive a video file from the internet or other electronic devices via a communication interface either through wire or wireless transmission as known per se and decode the video file into a sequence of video frames based on any video decoding algorithm.

Next, the processor 120 would convert each of the video frames into texture data (Step S206). The texture data is a data structure having an array of texture element values associated with grid of cells, such as a bitmap. The bitmap is characterized by the width and the height of a video frame in pixels and the number of bits per pixel. For example, the processor 120 may generate a bitmap for each YUV channel and the bitmaps are stored in the memory 110 as textures, and yet the disclosure is not limited in this regard.

Next, the processor 120 would perform shading computations on the texture data to respectively generate render video outputs for video preview (Step S208), where the shading computations are performed by a shader. The shader is a type of computer program that calculate rendering effects on graphics hardware with a high degree of flexibility. Shaders are widely used in video post-processing to produce infinite range of effects by manipulating the properties such as position, hue, saturation, brightness, and contrast of all pixels, vertices, and textures using shading algorithms as known per se. Hence, prior to the shading computations, the processor 120 would identify possible video viewing modes, either supported by the processing device 100, popularly selected, or from a default list, and set them as designated video viewing modes, where each of the shading computations corresponds to a different designated video viewing mode. Once all the designated video viewing modes are identified, the processor 120 would perform the shader computation corresponding to each of the designated video viewing modes by altering the same texture data differently and render the altered texture data corresponding to each of the designated video viewing modes to generate the corresponding render video outputs for video preview. For example, after the processor 120 identifies that all the designated video viewing modes are monoscopic, side-by-side stereoscopic, and over-under stereoscopic modes, the render video outputs respectively in such three modes would be created for video preview.

Figure 3:
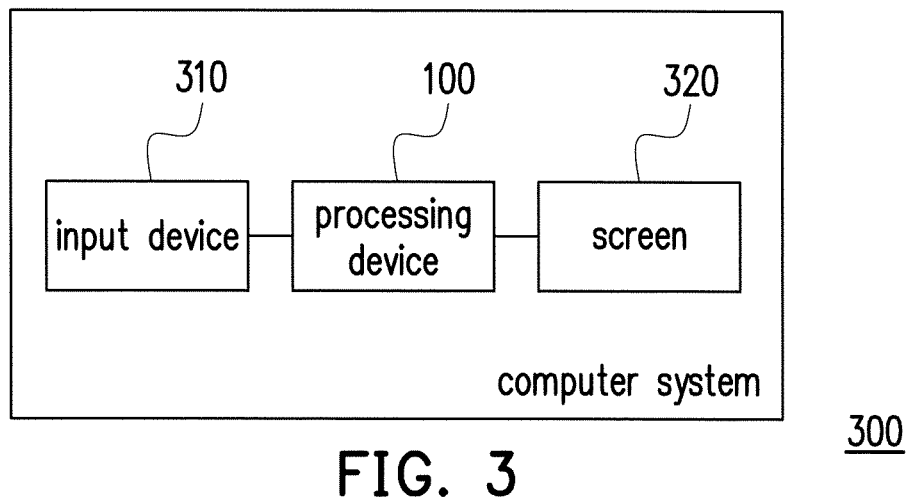
FIG. 3 illustrates a schematic diagram of a proposed computer system for video preview in accordance with one of the exemplary embodiments of the disclosure.

FIG. 3 illustrates a schematic diagram of a proposed computer system for video preview in accordance with one of the exemplary embodiments of the disclosure. All components of the computer system and their configurations are first introduced in FIG. 3. The functionalities of the components are disclosed in more detail in conjunction with FIG. 4.

Referring to FIG. 3, an exemplary computer system 300 would include an input device 310, a screen 320, and the processing device 100 connected to the input device 310 and the screen 320. The computer system 300 may be a personal computer, a laptop computer, a workstation, a television system, a gaming system, a virtual reality system, an augmented reality system, a mixed reality system, and so forth.

The input device 310 may be a handheld controller equipped with a motion sensor, a mouse, a joystick, a trackball, a touch pad, and/or buttons that permits the user to interact with the computer system 300.

The screen 320 may be a liquid crystal display (LCD), a light-emitting diode (LED) display, an organic light-emitting diode (OLED) display such as a monitor and a head-mounted display (including goggles, visors, glasses, helmets with face shields, and the like).

Figure 4:
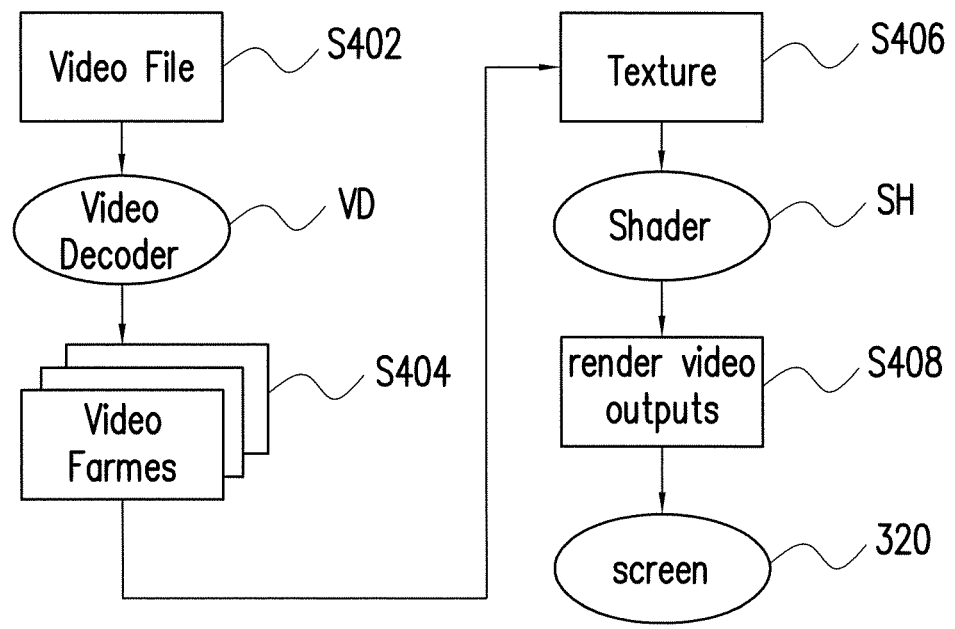
FIG. 4 illustrates a flowchart of a proposed method for video preview in accordance with one of the exemplary embodiments of the disclosure.

FIG. 4 illustrates a proposed method for video preview in accordance with one of the exemplary embodiments of the disclosure. The steps of FIG. 4 could be implemented by the proposed computer system 300 as illustrated in FIG. 3.

Referring to FIG. 4 in conjunction with FIG. 3, the processing device 100 would receive a video file (Step S402) and use a video decoder VD to decode the video file into video frames (Step S404). Next, the processing device 100 would convert each of the video frames into texture data (Step S406). The processing device 100 would use a shader SH to perform shading computations on the texture data to respectively generate render video outputs for video preview (Step S408). In the same manner as described previously with respect to the exemplary embodiment in FIG. 2, the detailed description of Step S402-S408 will not be repeated herein. In the present exemplary embodiment, Step S402 and Step S404 may be executed by a CPU, and Step S406 and S408 may be executed by a GPU for acceleration. Next, the processing device 100 would play the render outputs on a preview interface on the screen 320 in the virtual world for user selection through the input device 310. It should be noted that, the virtual world herein refers to a computer-based simulated environment such as a virtual reality environment with complete virtual immersion, an augmented reality environment with virtual objects layering on the real world, or a mixed reality environment with a merging of real and virtual worlds.

Figure 5A:
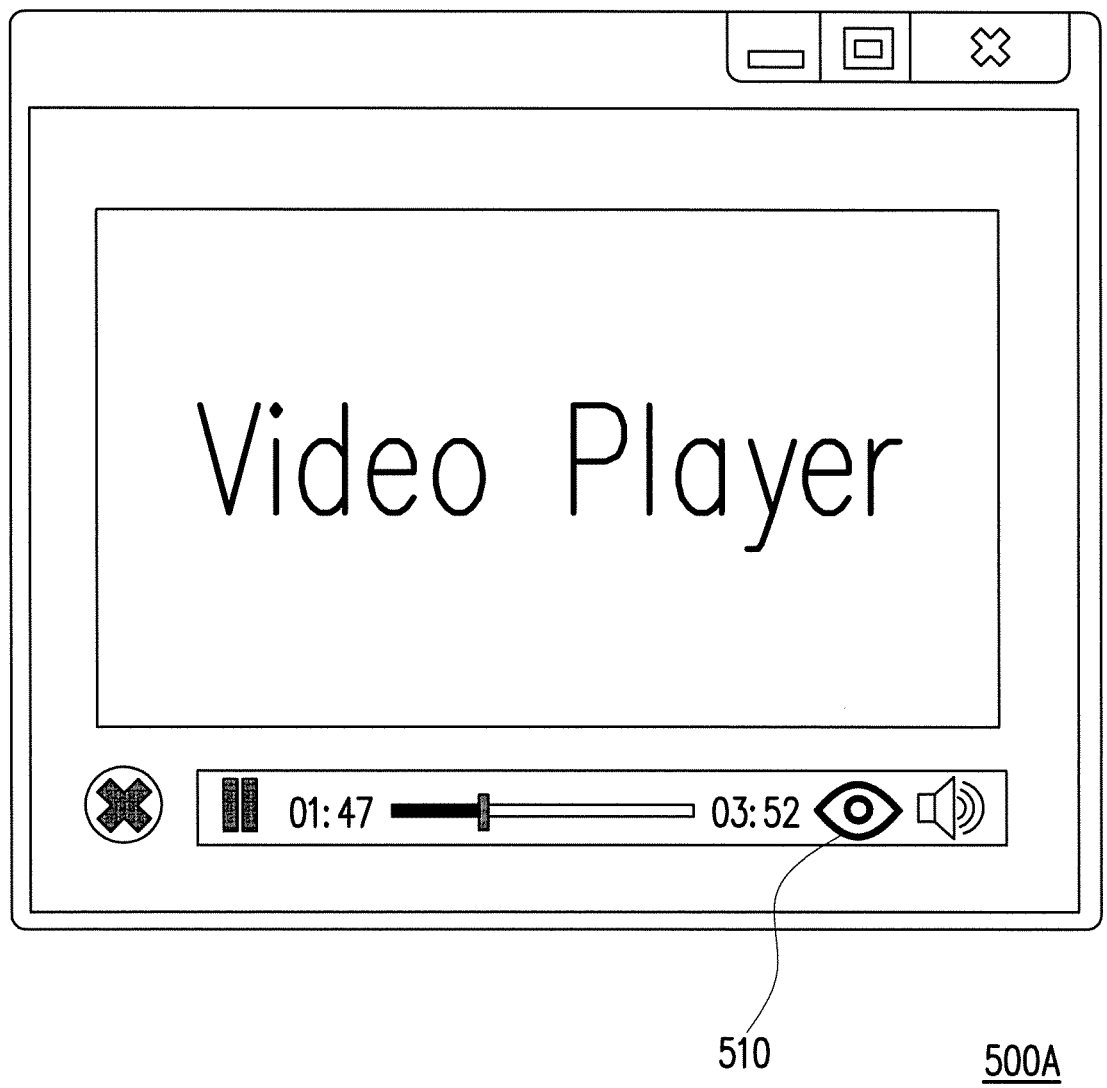
FIG. 5A illustrates a video player interface in accordance with one of the exemplary embodiments of the disclosure.

For better comprehension, assume the processing device 100 launches a video playback application in response to the user instruction to initiate video playback of a video file and displays a video player interface 500A on the screen 320 in the virtual world as illustrated in FIG. 5A in accordance with one of the exemplary embodiments of the disclosure. Referring to FIG. 5A, the video player interface 500A may include familiar features such as a playback screen, a scroll bar, a speaker control, a pause/resume control. Specifically, the video player interface 500A may also include a mode preview option 510. The user would be able to select the mode preview option 510 through the input device 310 during or before video playback.

Figure 5B:
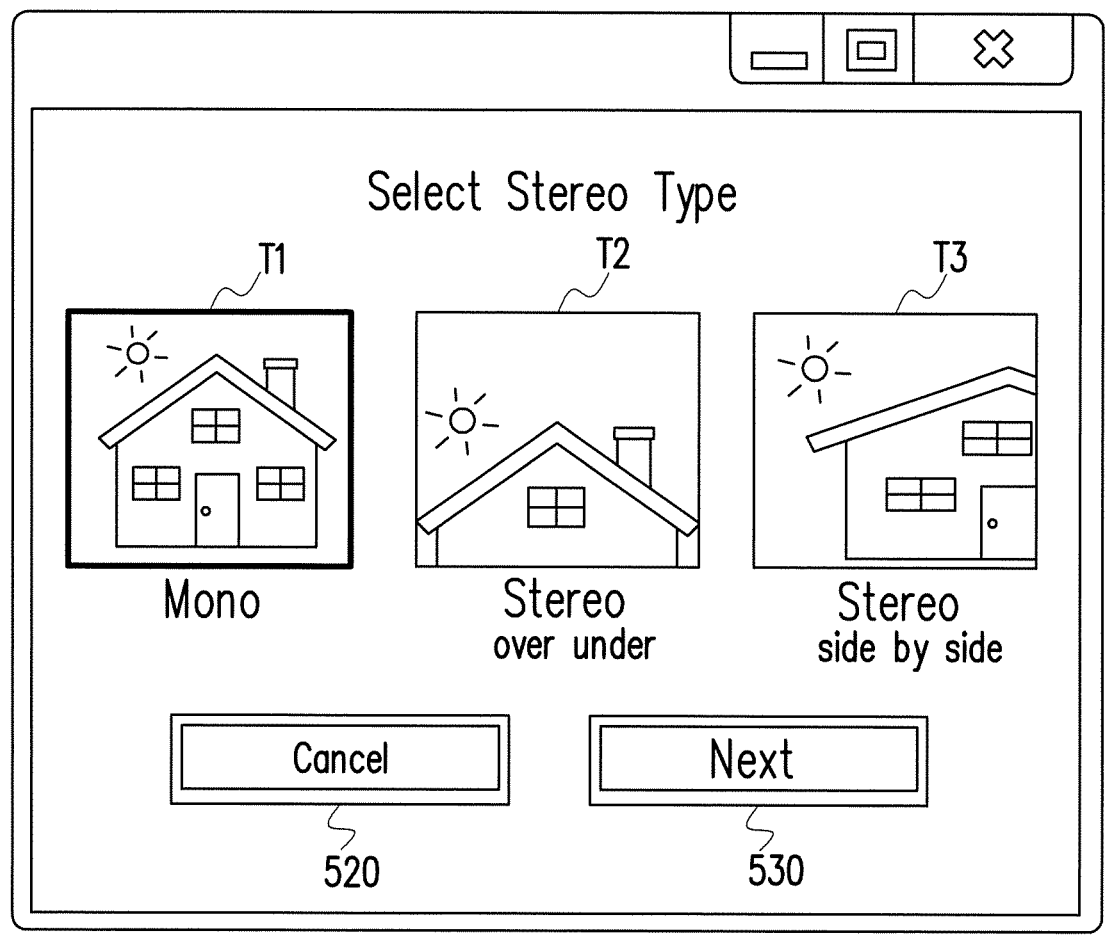
FIG. 5B illustrates a preview interface in accordance with one of the exemplary embodiments of the disclosure.

Once the processing device 100 detects a selection operation being performed on the mode preview option 510, it would next display a preview interface 500B on the screen 320 as illustrated in FIG. 5B in accordance with one of the exemplary embodiments of the disclosure. Referring to FIG. 5B, the processing device 100 would play a list of render video outputs, respectively in a monoscopic mode T1, a over-under stereoscopic mode T2, and an side-by-side stereoscopic mode T3, as thumbnails on the preview interface 500B. The preview interface 500B enables the user to preview the effect of three possible video viewing modes, and each of which is associated with a mode selecting option. From the video preview, it would be visually obvious for the user to determine whether there exists distortion, undesirable flashes and artifacts as well as to determine whether only half view in the three render video outputs, and it is therefore intuitive for the user to discern the most suitable video viewing mode for the video file.

The preview interface 500B would also include a "Cancel" button 520 and a "Next" button 530. The "Cancel" button 520 would allow the user to dismiss the preview interface 500B, and the "Next" button 530 would allow the user to confirm the selected video viewing mode. Assume that the user selects the monoscopic mode T1 and clicks on the "Next" button 530. In response to such selection operation, the processing device 100 would play the video file in the monoscopic mode T1 on the screen 320.

In view of the aforementioned descriptions, the method, the processing device, and the computer system, provide a user interface with video preview capability by rendering a video in multiple video viewing modes. Multiple independent previews would be played concurrently on the user interface. The rendered video outputs would be concurrently played such that the user is able to select the best viewing mode in a simple and intuitive fashion.

No element, act, or instruction used in the detailed description of disclosed embodiments of the present application should be construed as absolutely critical or essential to the present disclosure unless explicitly described as such. Also, as used herein, each of the indefinite articles "a" and "an" could include more than one item. If only one item is intended, the terms "a single" or similar languages would be used. Furthermore, the terms "any of" followed by a listing of a plurality of items and/or a plurality of categories of items, as used herein, are intended to include "any of", "any combination of", "any multiple of", and/or "any combination of multiples of the items and/or the categories of items, individually or in conjunction with other items and/or other categories of items. Further, as used herein, the term "set" is intended to include any number of items, including zero. Further, as used herein, the term "number" is intended to include any number, including zero.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for video preview, applicable to a computer system having a screen, an input device, and a processing device connected to the screen and the input device, wherein the method comprises steps of:
   receiving a video file by the processing device;
   decoding the video file to obtain a plurality of video frames by the processing device;
   converting each of the video frames into texture data by the processing device;
   performing a plurality of shading computations on the texture data by the processing device to respectively generate a plurality of render video outputs, wherein each of the shading computations corresponds to a different video viewing mode of a plurality of video viewing modes, wherein the video viewing modes comprise at least two of a monoscopic mode, a side-by-side stereoscopic mode, and an over-under stereoscopic mode;
   concurrently playing the render video outputs as thumbnails, each corresponding to a corresponding video viewing mode of the video viewing modes, on a preview interface on the screen in a virtual world by the processing device for user selection through the input device; and
   playing the video file in the corresponding selected video viewing mode in response to the user selection.

2. The method according to claim 1, wherein before the step of concurrently playing the render video outputs as the thumbnails, each corresponding to the corresponding video viewing mode of the video viewing modes, on the preview interface on the screen in the virtual world by the processing device, the method further comprises steps of:
   launching a video playback application and displaying a video player interface on the screen by the processing device, wherein the video player interface comprises a mode preview option;
   in response to a selection operation performed on the mode preview option, displaying the preview interface on the screen by the processing device.

3. The method according to claim 1, wherein the step of concurrently playing the render video outputs as the thumbnails, each corresponding to the corresponding video viewing mode of the video viewing modes, on the preview interface on the screen in the virtual world by the processing device further comprises:

associating each of the render video outputs on the preview interface with a mode selecting option by the processing device.

4. The method according to claim 3, wherein the step of playing the video file in the corresponding selected video viewing mode in response to the user selection comprises:

in response to a selection operation performed on a first mode selecting option among the mode selecting options, playing the video frames in the video viewing mode corresponding to the first mode selecting option in the virtual world by the processing device.

5. The method according to claim 1, wherein the video viewing modes comprise the monoscopic mode, the side-by-side stereoscopic mode, and the over-under stereoscopic mode.

6. The method according to claim 1, wherein the screen is a head-mounted display.

7. A computer system for video preview comprising:

a screen, configured to display contents;

an input device, configured to receive inputs from a user;

a processing device, connected to the screen and the input device, and configured to:

receive a video file and decode the video file to obtain a plurality of video frames;

convert each of the video frames into texture data and perform a plurality of shading computations on the texture data to respectively generate a plurality of render video outputs, wherein each of the shading computations corresponds to a different video viewing mode of a plurality of video viewing modes, wherein the video viewing modes comprise at least two of a monoscopic mode, a side-by-side stereoscopic mode, and an over-under stereoscopic mode;

concurrently play the render video outputs as thumbnails, each corresponding to a corresponding video viewing mode of the video viewing modes, in a preview interface on the screen in a virtual world for user selection through the input device; and play the video file in the corresponding selected video viewing mode in response to the user selection.

8. The computer system according to claim 7, wherein the processing device is further configured to launch a video playback application and displaying a video player interface comprising a mode preview option on the screen, wherein the video player interface comprises a mode preview option and display the preview interface in response to a selection operation performed on the mode preview option.

9. The computer system according to claim 7, wherein the processing device is further configured to associate each of the render video outputs in the preview interface with a mode selecting option.

10. The computer system according to claim 9, wherein the processing device is further configured to play the video frames in the video viewing mode corresponding to a first video viewing mode among the video viewing modes in response to a selection operation performed on the first mode selecting option.

11. The computer system according to claim 7, wherein the video viewing modes comprise the monoscopic mode, the side-by-side stereoscopic mode, and the over-under stereoscopic mode.

12. The computer system according to claim 7, wherein the screen is a head-mounted display.

* * * * *